Patented June 30, 1925.

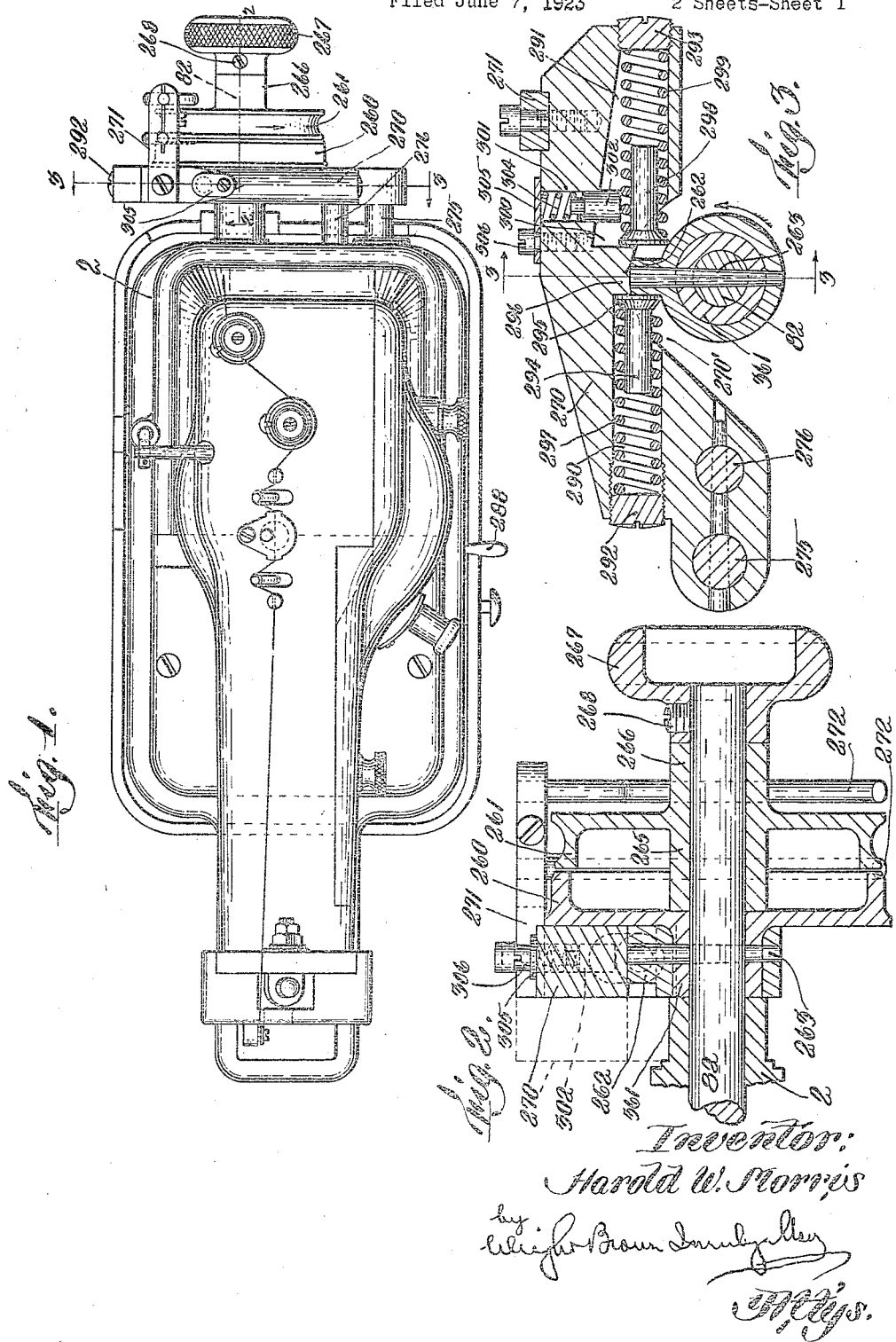

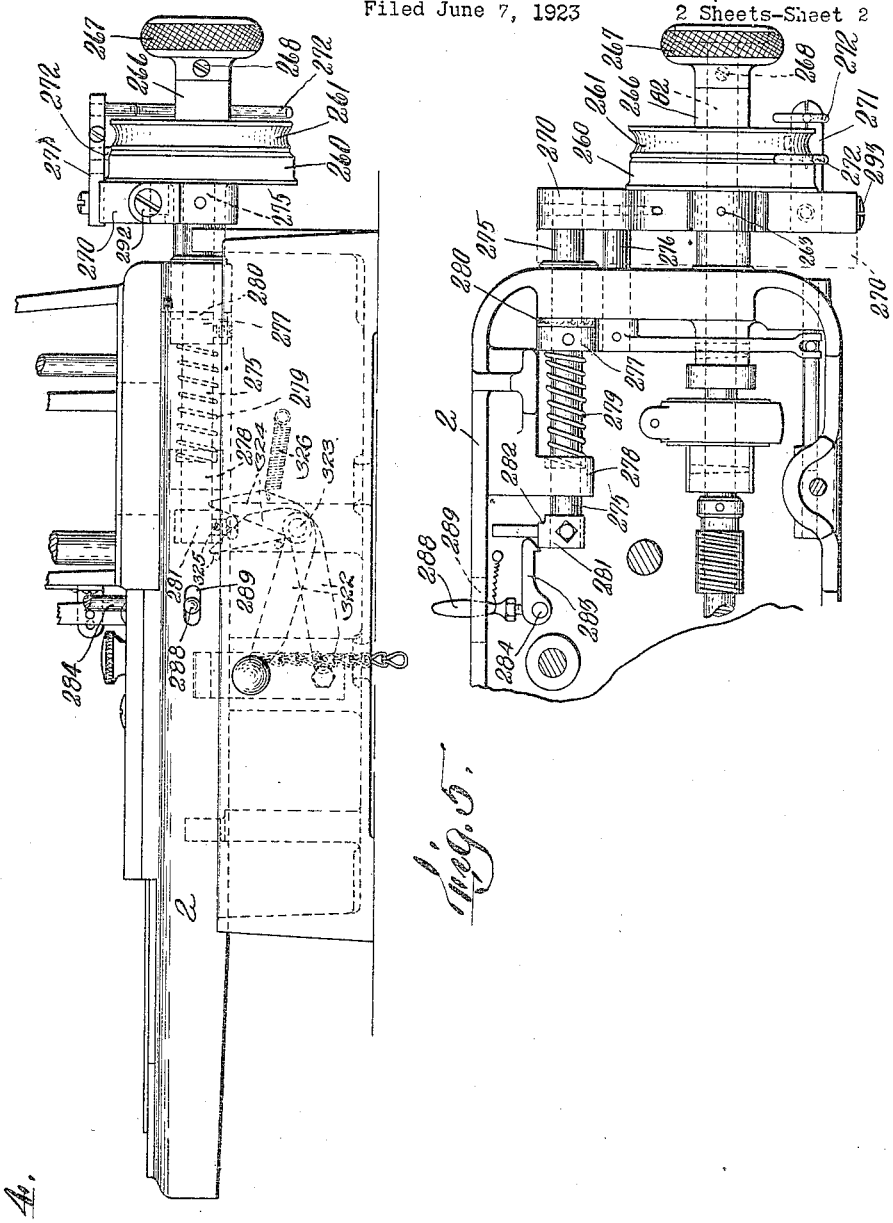

1,544,025

UNITED STATES PATENT OFFICE.

HAROLD W. MORRIS, OF WALTHAM, MASSACHUSETTS, ASSIGNOR TO FREDERICK OSANN COMPANY, OF NEW YORK, N. Y., A CORPORATION OF NEW YORK.

STOP MECHANISM.

Application filed June 7, 1923. Serial No. 643,898.

*To all whom it may concern:*

Be it known that I, HAROLD W. MORRIS, a citizen of the United States, residing at Waltham, in the county of Middlesex and State of Massachusetts, have invented new and useful Improvements in Stop Mechanism, of which the following is a specification.

This invention relates to stop mechanisms by which a power shaft may be operatively disconnected from a source of power and its rotation positively stopped in a definite angular position. While not restricted to such use it has been designed more particularly for application to button sewing machines and its various features of novelty will be described with particular reference to such a machine by way of illustration.

In general the mechanism comprises a member for operatively connecting and disconnecting a shaft from a rotating means, said member in the embodiment shown being a belt shipper urged by a spring into position to hold a driving belt on a pulley loose on the shaft and retained in position to hold the belt on a tight pulley by a latch. The belt shipper also contains a cushioned stop to stop the rotation of the shaft, and a rebound device acting to check the reverse rotation of the shaft caused by the rebound of the cushioned stop.

For a more complete understanding of this invention reference may be had to the accompanying drawings in which Figure 1 is a top plan of a button sewing machine showing the stop motion in position.

Figures 2 and 3 are detail sections on lines 2—2 and 3—3, respectively, of Figure 1.

Figure 4 is a side elevation of a lower portion of the machine showing stop motion parts therein by dotted lines.

Figure 5 is a fragmentary inverted plan of the machine.

Referring to Figures 1, 4 and 5, it will be noted that the drive shaft 82 extends through the rear end of the machine frame and carries thereon tight and loose pulleys 260 and 261. As shown more particularly in Figures 2 and 3 the tight pulley 260 is provided with a hub portion 361 having a laterally extending lug 262 thereon, and as shown this tight pulley is fixed to the shaft 82 by means of a tapered pin 263 extending through the lug; the main portion of the hub, and the shaft 82. The loose pulley 261 also has a hub portion 265 which bears against the inner rear face of the tight pulley 260 and an outer hub portion 266 which bears against the inner end of a hand wheel 267 made fast as by means of a set screw 268 to the outer end of the shaft 82.

A belt shipper is employed for shifting the belt between the tight and loose pulleys, this shipper comprising a body portion 270 cut away at 270' to partially surround the shaft 82, and to which is fixed an arm 271 carrying shifter fingers 272. When the belt shipper is in position to retain the belt on the loose pulley, the body portion 270 is positioned closely against the forward face of the tight pulley 260, while when the shipper is in position for the belt to engage the tight pulley, the body portion is out of lateral alinement with the hub 361 and is closely adjacent to the rear end of the machine frame as shown by dotted lines in Figure 5. For the purpose of moving the belt shipper between these two positions, the body portion has fixed thereto a pair of rods 275 and 276 which extend through guiding openings in the rear wall of the machine frame portion 2 and into the interior thereof. Within the frame, as shown in Figure 5, the rod 275 has fixed thereto a collar 277, between which and a fixed lug 278 extending inward from the machine frame, reacts a compression spring 279 which tends to retain the collar 277 pressed against a sound deadening and cushioning washer of felt or other suitable material shown at 280 positioned between the collar 277 and the inner face of the machine frame. This spring 279 tends to hold the belt shipper in its stopped position with the shipper fingers retaining the belt on the loose pulley.

Forwardly of the bearing 278 the rod 275 has fixed thereto a latch block 281 having a latch face 282 with which may engage the hook of a latch finger 283 by which means the rod 275 may be held in its forward position to retain the belt shipper fingers in position to hold the belt on to the tight pulley. This latch is fixed at the lower end of a rock shaft 284 which extends upwardly from the frame portion 2 of the machine. This shaft 284 is designed to be rocked by mechanism of the machine to effect stopping of the machine automatically, but as this forms no part of the present invention it is not herein illustrated. This latch hook may also be disengaged by hand at any time if desired, for this purpose a handle 288 being shown as made fast thereto at its inner end and projecting outwardly of the frame through a slot 289.

The belt shipper may be moved by means such as a treadle (not shown) to shift the belt on to the fixed pulley. For this purpose the treadle has a chain 321 fixed thereto, the upper end of which is connected to an arm 322 of a bell crank lever (see Figure 1) pivoted on a screw 323 which projects from the inner face of the machine base frame 1. The other arm 324 of the bell crank lever is engageable with a pin 325 extending from the latch collar 281. The finger 324 is normally held out of contact with the pin 325 by means of a spring 326 reacting between it and the inner face of the frame base 1.

When the belt shipper is in position to hold the belt on the loose pulley it is also designed to positively stop the rotation of the drive shaft. For this purpose devices are carried by the shipper body member 270 with which the lug 262 on the hub of the tight pulley is adapted to engage. Referring now particularly to Figure 3, it will be seen that this body portion has a pair of sockets 290 and 291 therein disposed on opposite sides of the cut away portion 270' and which are closed at their outer ends by threaded plugs 292 and 293, respectively. Within the socket 290 is positioned an abutment element 294 having a head 295 normally held in engagement by means of a compression spring 297 reacting between this head and the plug 292 with one side of a portion 296 projecting partially across the inner end of the socket 290 from the main portion of the body 270. The socket 291 carries a similar abutment 298 pressed against the opposite face of the portion 296 by means of a spring 299 reacting between its head and the plug 293. The socket 291, however, is enlarged upwardly as shown at 300 so as to permit abutment 298 to be entirely housed therein so that the lug 262 on the drive shaft may pass thereby in its rotation as in the direction of the arrow and strike against the head 295 of the abutment 294. It will also be noted that the portion 296 extends downwardly to just clear the end of the lug 262 in its rotation. As the lug 262 strikes the head 295 this abutment is driven back into its socket against the resistance of the spring 297 until the rotation of the shaft 82 is stopped, whereupon the spring 297 exerts a rebound action against the lug 262 and imparts a reverse rotation to the shaft 82. As the lug 262 in its normal direction of rotation passes beyond the head of the abutment 298 and beneath the portion 296, the abutment 298 may fall out of the enlarged portion 300 of its socket into position as shown in Figure 3 where it will be struck by the lug 262 on its rebound which thus serves to stop this rebound so that the drive shaft finally comes to rest with the lug 262 positioned between the abutments 294 and 298. In order to insure the immediate positioning of the abutment 298 as soon as the lug 262 has passed so that it may take the rebound therefrom, a spring pressed plunger 302 may be employed, this plunger being slidable in a perforation 301 in the body portion and impinging at its lower end on the spring 299 adjacent the inner end of the socket 291. This plunger 302 may be urged downwardly by means of a spring 304 seated in the perforation 301 and reacting between the upper face of the plunger and the lower face of a plate 305 which may be made fast to the top face of the body 270 by means of a screw 306. It will thus be seen that on tripping the latch hook 283 the belt shipper is immediately thrown to position the belt on the loose pulley and to effect a positive cushioned stop to the rotation of the drive shaft and that by pulling downwardly on the chain 321 the belt shipper may be moved to remove the stops from the shaft lugs 262 to position the belt on the tight pulley to start the machine.

Having thus described an embodiment of this invention it should be evident to those skilled in the art that many changes and modifications may be made therein without departing from its spirit or scope as defined by the appended claims.

I claim:

1. The combination with a shaft, tight and loose pulleys on said shaft, of a lug fixed to said shaft, a belt shipper movable axially of said shaft and held from rotation therewith, a pair of oppositely disposed sockets in said shipper, and yielding abutments in said sockets positioned on opposite sides of said lug in its path of motion when the shipper is in loose-pulley-belt-engaging position, the abutment to be first engaged by said lug being yieldable away from said shaft to permit said lug to strike the other abutment and be stopped thereby, said first engaged abutment then returning in position to stop the rebound of said shaft.

2. The combination with a shaft, tight and loose pulleys on said shaft, of a lug fixed to said shaft, a belt shipper movable axially of said shaft and held from rotation therewith, a pair of oppositely disposed sockets in said shipper, yielding abutments in said sockets positioned on opposite sides of said lug in its path of motion when the shipper is in loose-pulley-belt-engaging position, the abutment to be first engaged by said lug being yieldable away from said shaft to permit said lug to strike the other abutment and be stopped thereby, said first engaged abutment then returning in position to stop the rebound of said shaft, a spring for urging said shipper into shaft-stopping position, a latch for holding said shipper out of stopping position, and means for releasing said latch.

3. The combination with a shaft, and means for rotating said shaft, of a lug fixed to rotate with said shaft, a member movable axially of said shaft for operatively connecting and disconnecting said shaft and rotating means, said member having a pair of oppositely disposed sockets therein, yielding abutments in said sockets positioned on opposite sides of said lug in its path of motion when said member is in position to disconnect said shaft and rotating means, the abutment to be first engaged by said lug being yieldable away from said shaft to permit said lug to strike the other abutment and be stopped thereby, said first engaged abutment then returning in position to stop the rebound of said shaft.

4. The combination with a shaft, and means for rotating said shaft, of a lug fixed to rotate with said shaft, a member movable axially of said shaft for operatively connecting and disconnecting said shaft and rotating means, said member having a pair of oppositely disposed sockets therein, yielding abutments in said sockets positioned on opposite sides of said lug in its path of motion when said member is in position to disconnect said shaft and rotating means, the abutment to be first engaged being yieldable laterally to permit said shaft to strike the other abutment and to be stopped thereby, and yielding means for returning said first engaged abutment as soon as the lug has passed thereby into position to stop the rebound of said lug.

5. The combination with a shaft, and means for rotating said shaft, of a lug fixed to rotate with said shaft, a member movable axially of said shaft for operatively connecting and disconnecting said shaft and rotating means, said member having a pair of oppositely disposed sockets therein, yielding abutments in said sockets positioned on opposite sides of said lug in its path of motion when said member is in position to disconnect said shaft and rotating means, the abutment to be first engaged being yieldable laterally to permit said shaft to strike the other abutment and to be stopped thereby, and a spring pressed plunger engaging the side of said first engaged abutment for returning said first engaged abutment as soon as the lug has passed thereby into position to stop the rebound of said lug.

6. A stop device comprising a member having a pair of opposed sockets therein, a spring pressed abutment in each of said sockets extending toward the other in substantial alinement therewith, one of said sockets being laterally extended to permit its abutment to yield laterally out of said alinement, and a spring pressed plunger in said lateral extension and bearing on said abutment to yieldingly hold it in such alinement.

7. A belt shipper comprising a body portion cut away at one face to partially house a shaft and movable axially thereof, said body portion having oppositely disposed sockets opening at their adjacent ends into said cut away portions, spring pressed abutments seated in said sockets, said sockets having shoulder portions therebetween to limit the motion of said abutments toward each other, one of said sockets being enlarged to permit its abutment to move laterally, a yieldable member for urging said abutment into alinement with the other abutment, and belt shifter fingers movable by and carried with said body portion.

In testimony whereof I have affixed my signature.

HAROLD W. MORRIS.